No. 743,702. PATENTED NOV. 10, 1903.
A. J. FINK, Jr.
GAGE COCK.
APPLICATION FILED SEPT. 12, 1903.
NO MODEL.

Andrew J. Fink, Jr.
Inventor

Witnesses
Katharine Kelly
Florence Kelly

By Attorney

No. 743,702. Patented November 10, 1903.

UNITED STATES PATENT OFFICE.

ANDREW J. FINK, JR., OF READING, PENNSYLVANIA.

GAGE-COCK.

SPECIFICATION forming part of Letters Patent No. 743,702, dated November 10, 1903.

Application filed September 12, 1903. Serial No. 172,875. (No model.)

*To all whom it may concern:*

Be it known that I, ANDREW J. FINK, Jr., a citizen of the United States, residing at Reading, in the county of Berks and State of Pennsylvania, have invented certain new and useful Improvements in Gage-Cocks; and I do hereby declare the following to be a full, clear, and exact description of the invention, such as will enable others skilled in the art to which it appertains to make and use the same.

This invention relates to improvements in gage-cocks; and the object of the invention is to provide an attachment whereby said gage-cock may be easily kept free from clogging or closing up, caused by foreign substances, insuring a positive opening therethrough, making the gage-cock absolutely reliable.

The invention consists of a plunger passing entirely through the gage-cock longitudinally, capable of being pushed forward and backward therein.

The invention is more fully described in the following specification and clearly illustrated in the accompanying drawings, in which—

Figure 1:
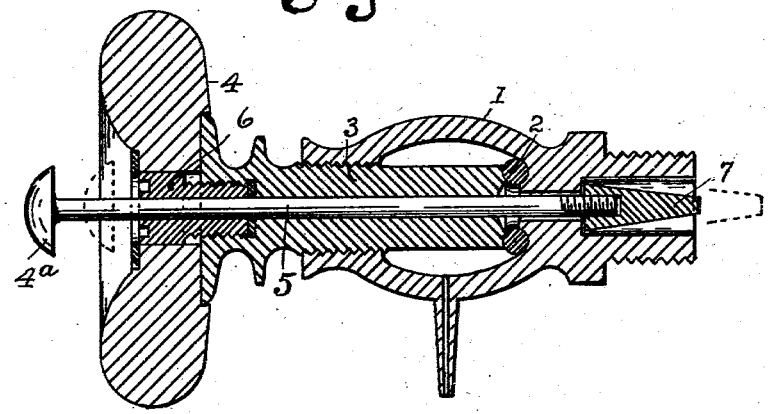
Figure 2:
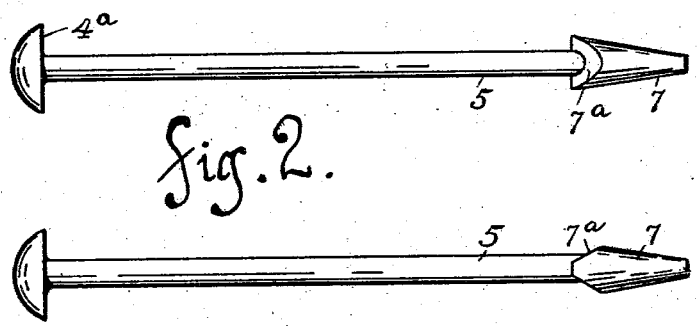

Figure 1 is a longitudinal sectional view of a gage-cock, showing my improvement. Fig. 2 is a detail of the plunger.

1 is the casing of the gage-cock, of ordinary construction, having the usual valve 2 and valve-stem 3.

4 is the operating-handle for the valve.

5 is a plunger-rod which passes entirely through the gage-cock. Its one end projects beyond the handle 4 and is formed with a suitable button or handle $4^a$. A stuffing-box 6 is located in the handle 4, through which said plunger passes. The plunger-rod passes through the valve 2, and its inner end is screw-threaded externally. Onto this screw-threaded end is placed a conical head-piece 7, screw-threaded internally. This head-piece is cut away at one or more points $7^a$ at its larger diameter to permit free passage of the steam or water into the casing 1.

The gage-cock is placed in position on the boiler, as usual, and an occasional operation or movement of the plunger by the attendant will insure a free opening therethrough, as the plunger will force away and remove any foreign substance that may gather at or in the mouth of the opening to the valve-casing. The boiler-pressure will tend to keep the plunger in normal position.

The device may of course be applied with equal facility to other constructions and, in fact, wherever a test connection to a steam-boiler is made.

Having thus fully described my invention, what I claim as new, and desire to secure by Letters Patent, is—

A gage-cock comprising a casing, a valve, a valve-stem, an operating-handle on said stem, a stuffing-box in said handle and a plunger-rod passing longitudinally through the entire gage-cock, having a handle or button on the outer end and a cone-shaped head-piece on the inner end, substantially as and for the purpose set forth.

In testimony whereof I affix my signature in presence of two witnesses.

ANDREW J. FINK, JR.

Witnesses:
 ED. A. KELLY,
 W. M. HIGH.